US012449116B2

(12) United States Patent
Jha et al.

(10) Patent No.: US 12,449,116 B2
(45) Date of Patent: Oct. 21, 2025

(54) AIRCRAFT LIGHT, AIRCRAFT COMPRISING AN AIRCRAFT LIGHT, METHOD OF ASSEMBLING AN AIRCRAFT LIGHT, AND METHOD OF MANUFACTURING A SENSOR CAP FOR AN AIRCRAFT LIGHT

(71) Applicant: Goodrich Lighting Systems GmbH & Co. KG, Lippstadt (DE)

(72) Inventors: Anil Kumar Jha, Lippstadt (DE); Jens Leuschner, Mohnesee (DE); Elmar Schrewe, Anrochte (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 18/777,345

(22) Filed: Jul. 18, 2024

(65) Prior Publication Data
US 2025/0043947 A1 Feb. 6, 2025

(30) Foreign Application Priority Data
Aug. 1, 2023 (EP) .................................... 23189104

(51) Int. Cl.
*F21V 23/04* (2006.01)
*B64D 11/00* (2006.01)
*B64D 47/06* (2006.01)
*F21W 107/30* (2018.01)

(52) U.S. Cl.
CPC .......... *F21V 23/0457* (2013.01); *B64D 11/00* (2013.01); *B64D 47/06* (2013.01); *B64D 2011/0038* (2013.01); *B64D 2011/0053* (2013.01); *F21W 2107/30* (2018.01)

(58) Field of Classification Search
CPC .................................................. F21V 23/0457
See application file for complete search history.

(56) References Cited

U.S. PATENT DOCUMENTS

| 7,055,994 B2 | 6/2006 | Martin |
| 2006/0086890 A1 | 4/2006 | Chao et al. |
| 2015/0212114 A1 | 7/2015 | Mayo et al. |

(Continued)

FOREIGN PATENT DOCUMENTS

| CN | 108141679 | 7/2020 |
| EP | 0230303 | 7/1987 |

(Continued)

OTHER PUBLICATIONS

EPO, Extended European Search Report dated Jan. 16, 2024 in EP Serial No. 23189104.5.

*Primary Examiner* — Joseph L Williams
(74) *Attorney, Agent, or Firm* — SNELL & WILMER L.L.P.

(57) ABSTRACT

An aircraft light comprises: at least one light source for providing an aircraft light output; a light sensor for detecting a performance level of the aircraft light output; and a sensor cap, arranged over the light sensor and defining a cavity for accommodating the light sensor. The sensor cap has a layered structure comprising: a cap-shaped support layer; a first coating layer, wherein the first coating layer is made of a first metal and is arranged on an inner side of the cap-shaped support layer; and a second coating layer. The second coating layer is made of a second metal and is arranged on the first coating layer.

20 Claims, 10 Drawing Sheets

(56) References Cited

U.S. PATENT DOCUMENTS

2015/0270227 A1 9/2015 Dinh et al.
2021/0099626 A1* 4/2021 Kwon .................... H04N 23/54
2023/0104397 A1 4/2023 Wang et al.

FOREIGN PATENT DOCUMENTS

| EP | 3205584 | 6/2020 |
| EP | 4026774 | 7/2022 |
| EP | 4082918 | 11/2022 |
| KR | 101793180 | 11/2017 |

* cited by examiner

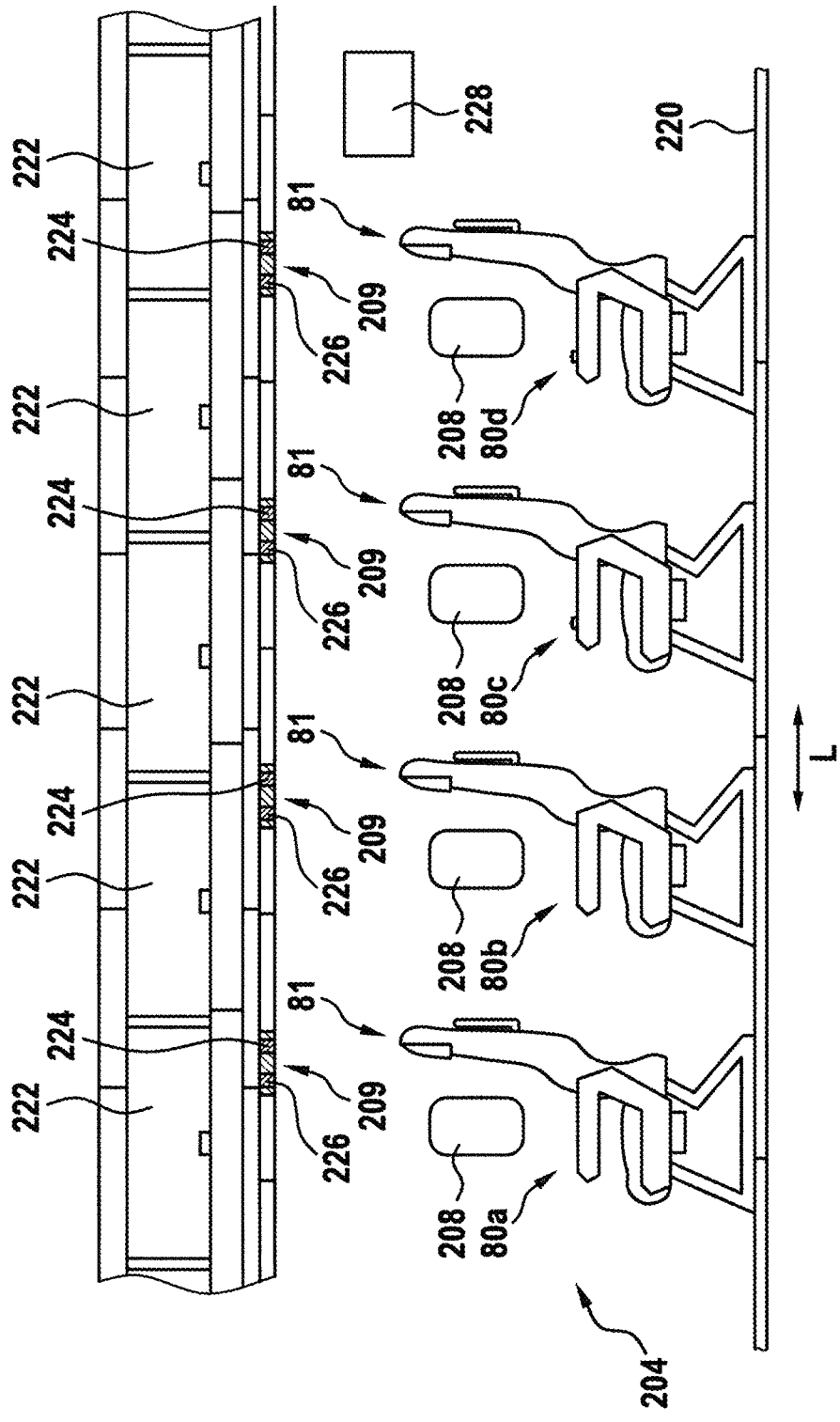

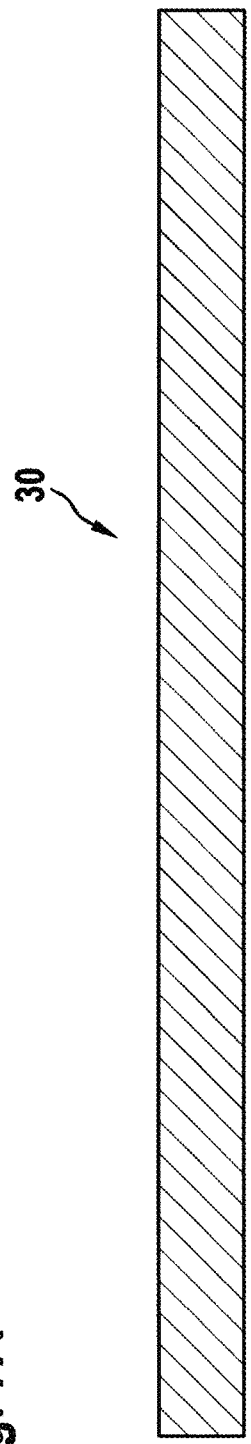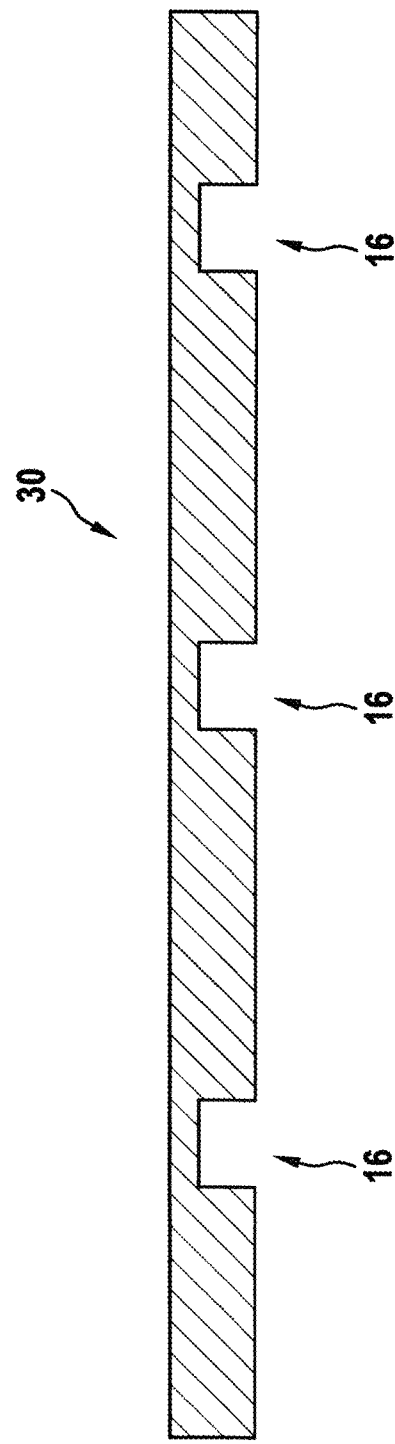
Fig. 7A
Fig. 7B

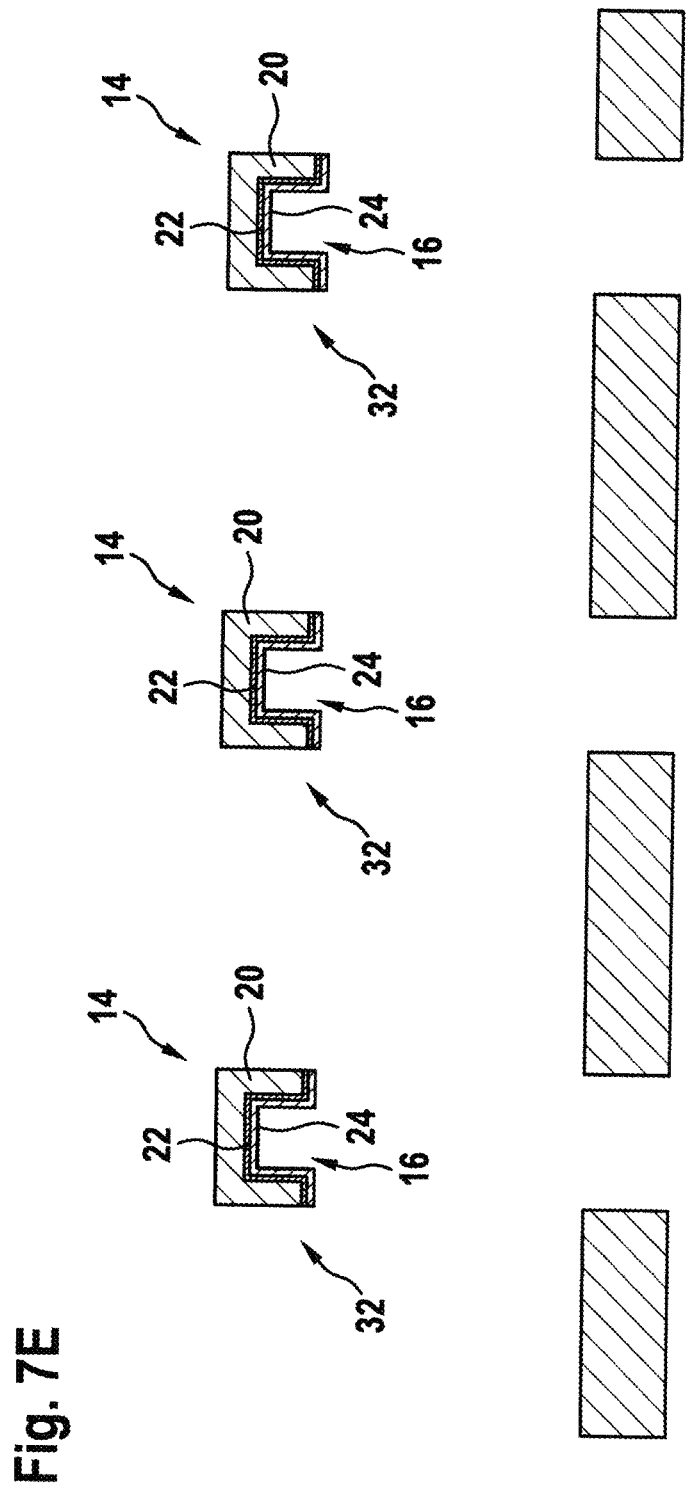

AIRCRAFT LIGHT, AIRCRAFT COMPRISING AN AIRCRAFT LIGHT, METHOD OF ASSEMBLING AN AIRCRAFT LIGHT, AND METHOD OF MANUFACTURING A SENSOR CAP FOR AN AIRCRAFT LIGHT

CROSS-REFERENCE TO RELATED APPLICATIONS

This application claims priority to and the benefit of EP Patent Application No., 23189104.5 filed Aug. 1, 2023 and titled "AIRCRAFT LIGHT, AIRCRAFT COMPRISING AN AIRCRAFT LIGHT, METHOD OF ASSEMBLING AN AIRCRAFT LIGHT, AND METHOD OF MANUFACTURING A SENSOR CAP FOR AN AIRCRAFT LIGHT," which is incorporated by reference herein in its entirety for all purposes.

FIELD

The present invention relates to aircraft lighting. In particular, the present invention relates to an aircraft light. The present invention further relates to an aircraft comprising such an aircraft light, to a method of assembling an aircraft light, and to a method for manufacturing a sensor cap for an aircraft light.

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior light units are navigation lights, also referred to as position lights, red-flashing beacon lights, white strobe anti-collision lights, wing scan lights, engine scan lights, take-off lights, landing lights, taxi lights, runway turn-off lights, etc. Passenger aircraft, such as commercial airplanes, which comprise a passenger cabin with passenger seats, are usually equipped with general passenger cabin lights for illuminating the passenger cabin and washroom lights for illuminating washrooms. Such passenger aircraft are usually further equipped with a plurality of individually switchable passenger reading lights and a plurality of individually switchable signal lights. All of these lights are examples of interior aircraft lights.

Aircraft lights may comprise electronic components, such as sensors. It is beneficial to electromagnetically shield the electronic components from the environment, in order to prevent electromagnetic interference (EMI). Known shielding devices, such as shielding caps, are often difficult to produce, costly, heavy, and/or not easy to mount. In addition, light barriers, such as light sensor caps, are often not fully satisfactory in blocking undesired light from reaching a light sensor of the aircraft light and/or are difficult/costly to produce.

It would therefore be beneficial to provide an aircraft light with an improved shielding device for electromagnetically shielding one or more electronic components of the aircraft light.

SUMMARY

Exemplary embodiments of the invention include an aircraft light that comprises: at least one light source, for example at least one LED, for providing an aircraft light output; a light sensor for detecting a performance level of the aircraft light output; and a sensor cap, arranged over the light sensor and defining a cavity for accommodating the light sensor. The sensor cap has a layered structure comprising at least three layers. The three layers include a cap-shaped support layer; a first coating layer; and a second coating layer. The first coating layer is made of a first metal and is arranged, in particular deposited, on an inner side of the cap-shaped support layer, i.e. on the side of the cap-shaped support layer facing the cavity. The second coating layer is made of a second metal and is arranged, in particular deposited, on the first coating layer, so that the first coating layer is sandwiched between the cap-shaped support layer and the second coating layer.

In an aircraft light according to an exemplary embodiment of the invention, the cap-shaped support layer of the sensor cap defines the shape and provides mechanical strength for the sensor cap. The combination of the two coating layers made of metal, which are applied to the cap-shaped support layer of the sensor cap, provides an effective electromagnetic interference shield (EMI shield) for ensuring a low level of electromagnetic interference or even preventing electromagnetic interference at the light sensor. As a result, a sensor cap of an aircraft light according to an exemplary embodiment of the invention provides an effective protection against electromagnetic interference between the light sensor and, potentially, other electronic component(s) arranged within the cavity on the one hand and other electronic components, which may be arranged outside the cavity, and/or larger scale electronic influences from the outside environment on the other hand. The other electronic components, arranged outside the cavity, may include other components of the aircraft light, in particular components of a controller, which is provided for driving and controlling the at least one light source of the aircraft light. The other electronic components may further include other electronic components of the aircraft, to which the aircraft light is mounted, which are arranged outside of and separate from the aircraft light. In particular, the power supply network and/or wireless communication devices of the aircraft may be a concern in terms of electromagnetic interference, which concern may be addressed in a particularly good manner with the sensor cap described herein.

The first coating layer may be made of a transition metal, such as copper, or of an alloy mostly comprising one or more transition metals, and/or the second coating layer may be made of a noble metal, such as gold, or of an alloy mostly comprising one or more noble metals.

The metallic material for the second coating layer, which is not covered by another layer, but which is exposed to the environment, may in particular be a noble metal, such as gold, which is less prone to erosion and/or oxidation.

It is also possible that other metals are used for the second coating layer. In particular, it has been found that tin is a suitable alternative to gold.

Combining at least two coating layers, made of different metals, may allow for providing particularly good shielding capabilities of the electromagnetic shield, provided by the at least two coating layers, at reasonable costs. In particular, good shielding may be achieved at reasonable cost by combining a thicker first coating layer of a less expensive metal, such as copper, and a thinner second coating layer of a more expensive metal, in particular a noble metal, such as gold.

The metal that forms the inner second coating layer and that faces the light sensor may be selected to have light reflection characteristics that are beneficial for the operation of the light sensor. The metallic material of the second coating layer may in particular be selected to strongly reflect the light present in the cavity, in order for a high percentage of the light to eventually reach the light sensor.

In an embodiment, the cap-shaped support layer is made of a resin material or of a plastics material or of a composite material, such as a fiberglass-reinforced composite material, in particular FR-4. These materials may be machined conveniently for forming the cap-shaped support layer. As these materials are often used for manufacturing support boards, leftovers of these materials, which are left over from the manufacturing of the support boards, may be used as inexpensive raw material for forming sensors caps that are used in aircraft lights according to exemplary embodiments of the invention.

In an embodiment, the aircraft light comprises an optical system for shaping the aircraft light output from light emitted by the at least one light source. The optical system may comprise one or more lenses and/or one or more reflectors and/or one or more shutters. The component(s) of the optical system may be arranged in a configuration that is suitable for shaping a desired aircraft light output of the aircraft light. The aircraft light may comprise further components, such as an aircraft light housing, a protective cover, power supply and control electronics, etc.

In an embodiment, at least one opening is formed within the sensor cap. The at least one opening allows a light evaluation portion of the light, emitted by the at least one light source, to pass through the at least one opening into the cavity for being detected by the light sensor. The opening may have a lateral extension, in particular a diameter, which is in the range of between 0.3 mm and 1 mm, in particular a lateral extension in the range of between 0.5 mm and 0.6 mm.

A sensor cap, which is provided with at least one opening, additionally acts as a light shield, which blocks undesired light from reaching the light sensor, but allows a dedicated portion of light, in particular a light evaluation portion of the light emitted by the at least one light source, to reach the light sensor. With the EMI shielding and the light blocking functionality being combined into a single device, the need for providing the light sensor of the aircraft light with a dedicated shielding device may be eliminated. As a result, the weight and the costs of the aircraft light may be kept particularly low.

In an embodiment, two or more openings, in particular two, three, four, five, six, seven, or eight openings, are formed within the sensor cap, increasing the amount of light entering into the cavity. A plurality of openings, formed within the sensor cap, may also result in a more uniform distribution of the light within the cavity, allowing for a more reliable evaluation of the detected light.

In an embodiment, the sensor cap is fully opaque. The sensor cap may in particular not comprise/be free of any openings, which would allow light to pass into the cavity, formed within the sensor cap. In such an embodiment, the aircraft light may further comprise a reference light source, and the reference light source may be arranged within the cavity defined by the sensor cap. The reference light source is configured for emitting a reference light output to be detected by the light sensor. The reference light source may allow for deducing a performance level of the aircraft light output based on the reference light output detected by the light sensor.

In an embodiment, the sensor cap is mounted to a support board, such as a printed circuit board. The sensor cap may in particular be soldered to the support board. Soldering provides an inexpensive method of reliably fixing the sensor cap to the support board.

In an embodiment, the support board comprises at least one metallic mounting area; and at least one of the first coating layer and the second coating layer of the sensor cap is soldered to the at least one metallic mounting area.

In an embodiment, at least a portion of a surface of the support board, which is covered by the sensor cap, is provided as a light reflective surface, in particular as a diffusely reflective surface, such as a white surface. This may enhance the reflection of light within the cavity and, in consequence, may increase the amount of light detected by the light sensor and improve the quality/reliability of the detection of the performance level of the aircraft light output.

The light reflective portion of the surface of the support board may be a portion of the support board coated with a light reflective coating, in particular with a diffusely reflective coating, such as a white coating.

In an embodiment, the cap-shaped support layer has a peripheral wall with an end face, the end face facing the support board, and at least one of the first coating layer and the second coating layer extends onto the end face, providing a foot portion/terminal portion of the respective coating layer. Such a foot portion/terminal portion may be conveniently soldered to a corresponding metallic mounting area provided on the support board.

In an embodiment, the cap-shaped support layer has a thickness in the range of between 0.3 mm and 0.5 mm, in particular a thickness of about 0.4 mm. A thickness of the cap-shaped support layer selected from this range has been found to provide the sensor cap with sufficient mechanical stability, without using a large amount of material, which would add excess weight to the sensor cap.

In an embodiment, the first coating layer has a thickness in the range of between 10 µm and 50 µm, in particular a thickness in the range of between 20 µm and 30 µm, more particularly a thickness of about 25 µm.

In an embodiment, the second coating layer has a thickness in the range of between 0.025 µm and 0.2 µm, in particular a thickness of in the range of between 0.05 µm and 0.10 µm. The given thicknesses are particularly suitable, in case gold or silver is used for the second coating layer. In case tin is used for the second coating material, the second coating layer may have a larger thickness, in particular a thickness of more than 1 µm, further in particular a thickness of between 1 µm and 10 µm.

Such thicknesses of the first and second coating layers haven been found to provide an effective electromagnetic shield against electromagnetic interference, without using excess amounts of material, which would unduly increase the weight and the costs of the sensor cap. Also, the mentioned thicknesses of the first and second coating layers are in line with standard manufacturing techniques for copper and gold coating. Hence, the application of the first and second coating layers may be conveniently included into the manufacturing steps typically applied to a printed circuit board.

The cavity and the sensor cap may have a rectangular shape, in particular a quadratic, shape. The rectangular/quadratic shape may have rounded corners. Alternatively, the cavity and the sensor cap may have an overall rounded shape, in particular a circular shape or an elliptical shape.

In an embodiment, the cavity has a height in the range of between 1.0 mm and 2.5 mm, in particular a height in the range of between 1.5 mm and 2.0 mm.

The cavity may have the same lateral extensions in at least two dimensions, in particular in two dimensions that are oriented orthogonal with respect to each other. The cavity may have in particular a quadratic shape. Alternatively, the cavity may have different lateral extensions in at least two dimensions, in particular in two dimensions that are oriented orthogonal with respect to each other. The cavity may in particular have a rectangular shape.

The cavity may have lateral extensions in the range of between 3 mm and 10 mm, in particular lateral extensions in the range of between 5 mm and 8 mm.

Such dimensions have been found as suitable for allowing the cavity to house the electronic components of the aircraft light that are to be shielded, in order to keep electromagnetic interference low or to even prevent electromagnetic interference.

In an embodiment, the aircraft light further comprises an electronic evaluation component for determining the performance level of the aircraft light output from a light detection signal provided by the light sensor. In particular, the electronic evaluation component may determine at least one of aging of the at least one light source over time, thermal degradation of the at least one light source, and a complete failure of one or more of the at least one light source.

In an embodiment, the aircraft light further comprises a controller, coupled to the electronic evaluation component, wherein the controller is configured to drive the at least one light source depending on the performance level of the aircraft light output. In this way, when a degradation/decline of the light output of the aircraft light output is detected, the degradation/decline may be addressed/counteracted by increasing the light output of the at least one light source. In particular, a driving current of the at least one light source may be increased, and the performance level of the aircraft light output may be brought back to an acceptable level.

In an embodiment, the aircraft light is an interior aircraft light, such as a general cabin illumination light. a signal light, or a passenger reading light.

In an embodiment, the aircraft light is an exterior aircraft light, such as an aircraft navigation light or a white strobe anti-collision light or a red-flashing aircraft beacon light or a logo light or a wing scan light or an engine scan light or a cargo loading light or an aircraft headlight, for example an aircraft landing light or an aircraft take-off light or an aircraft taxi light or an aircraft runway turn-off light, or a multi-functional exterior aircraft light, having the functionalities of at least two of an aircraft navigation light, a white strobe anti-collision light, a red-flashing aircraft beacon light, a logo light, a wing scan light, an engine scan light, a cargo loading light, an aircraft landing light, an aircraft take-off light, an aircraft taxi light, and an aircraft runway turn-off light.

The aircraft light may also be a multi-functional aircraft headlight, which combines the functionalities of at least two of an aircraft landing light, an aircraft take-off light, an aircraft taxi light, and an aircraft runway turn-off light.

Exemplary embodiments of the invention further include a method for manufacturing a sensor cap for an aircraft light, in particular for an aircraft light according to an exemplary embodiment of the invention, wherein the method includes: machining a cavity into a block of a support material, in particular into a block of an FR-4 material; coating the inner walls of the cavity with a first metal; coating the first metal with a second metal; and cutting out a portion from the block of support material, with the cut-out portion comprising the cavity. As a result, the sensor cap may have a lid portion and peripheral walls extending basically orthogonal form the lid portion. Desmearing and direct metalization processes may be employed for forming the first coating layer and/or the second coating layer. The additional features, modifications and effects, as described above with respect to an aircraft light, apply to the method for manufacturing a sensor cap for an aircraft light in an analogous manner.

The method may take place as part of a joint manufacturing of a plurality of sensor caps, wherein the joint manufacturing of a plurality of sensor caps comprises the steps of: machining a plurality of cavities into a plurality of portions of the block of support material; coating the inner walls of each of the plurality of cavities with the first metal; coating the first metal in each of the plurality of cavities with the second metal; and cutting out the plurality of portions from the block of composite material.

Exemplary embodiments of the invention also include a method of assembling an aircraft light, in particular assembling an aircraft light according to an exemplary embodiment of the invention, wherein the method includes manufacturing a sensor cap, as it has been described before; mounting a light sensor to a support board, the support board in particular comprising at least one metallic mounting area; arranging the sensor cap over the light sensor and mounting the sensor cap to the support board, with the light sensor being arranged within the cavity of the sensor cap. The mounting of the sensor cap to the support board may in particular comprise soldering at least one of the first metal and the second metal of the sensor cap to the support board, in particular to the at least one metallic mounting area provided on the support board. The additional features, modifications and effects, as described above with respect to an aircraft light, apply to the method of assembling an aircraft light in an analogous manner. Exemplary embodiments of the invention further include an aircraft, such as an airplane or a helicopter, which is equipped with at least one aircraft light according to an exemplary embodiment of the invention. The additional features, modifications and effects, as described above with respect to an aircraft light and/or with respect to a method for manufacturing a sensor cap and/or with respect to a method for assembling an aircraft light, apply to the aircraft in an analogous manner.

It has been found that the sensor cap, as described herein, is also suitable for shielding electronic components other than a light sensor. In particular, it has been found that the sensor cap is suitable for shielding various kinds of EMI sensitive electronic components, in particular small-scale EMI sensitive electronic components. It is considered part of the invention to provide an aircraft light where the cap is arranged over one or more electronic components other than a light sensor. Stated in a claim-like manner, exemplary embodiments of the invention include an aircraft light, comprising: at least one light source for providing an aircraft light output; an electronic component; an electronic component cap, arranged over the electronic component and defining a cavity for accommodating the electronic component; the sensor cap having a layered structure comprising: a cap-shaped support layer; a first coating layer, wherein the first coating layer is made of a first metal and is arranged on an inner side of the cap-shaped support layer; and a second coating layer, wherein the second coating layer is made of a second metal and is arranged on the first coating layer. The electronic component may be an electronic component related to the control and/or power supply for the at least one light source. In particular, the electronic component may be the power supply and control electronics of the aircraft light. The additional features, modifications and effects, as described above, apply to the aircraft without a light sensor underneath the cap in an analogous manner.

It has further been found that, in some application scenarios, particularly in application scenarios where the aircraft light operates in a very dry environment and/or is kept dry in an effective manner, the second coating layer may be dispensed with. It is considered part of the invention to provide the aircraft light, as described herein, without the second coating layer of the sensor cap. Stated in a claim-like manner, exemplary embodiments of the invention include an aircraft light, comprising: at least one light source for providing an aircraft light output; a light sensor for detecting a performance level of the aircraft light output; and a sensor cap, arranged over the light sensor and defining a cavity for accommodating the light sensor; the sensor cap having a layered structure comprising: a cap-shaped support layer; and a single coating layer, wherein the single coating layer is made of metal and is arranged on an inner side of the cap-shaped support layer. The additional features, modifications and effects, as described above, apply to the aircraft without a second coating layer on the sensor cap in an analogous manner. In particular, the additional features, modifications and effects, as described above with respect to the first coating layer of the sensor cap, apply to the single coating layer in an analogous manner.

BRIEF DESCRIPTION OF THE DRAWINGS

Further exemplary embodiments of the invention are described below with respect to the accompanying drawings, wherein:

FIG. 2 shows a schematic longitudinal cross-sectional view of a section of the passenger cabin of the aircraft shown in FIGS. 1A and 1B;

FIGS. 7A to 7E illustrate several steps of a method of manufacturing a sensor cap according to an exemplary embodiment of the invention.

DETAILED DESCRIPTION

Figure 1A:
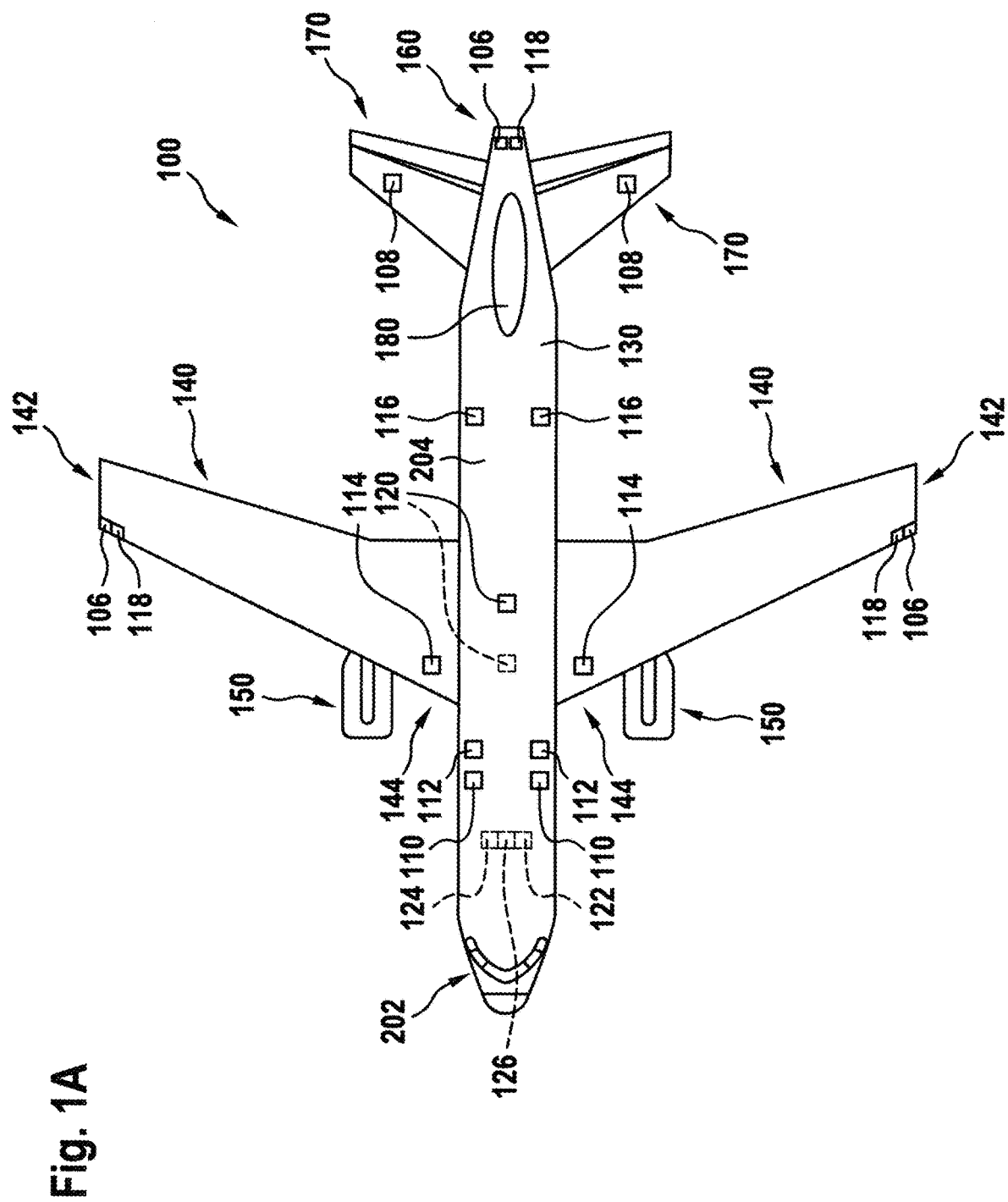
FIG. 1A shows a schematic top view of an aircraft, which is equipped with a variety of exterior aircraft lights.
Figure 1B:
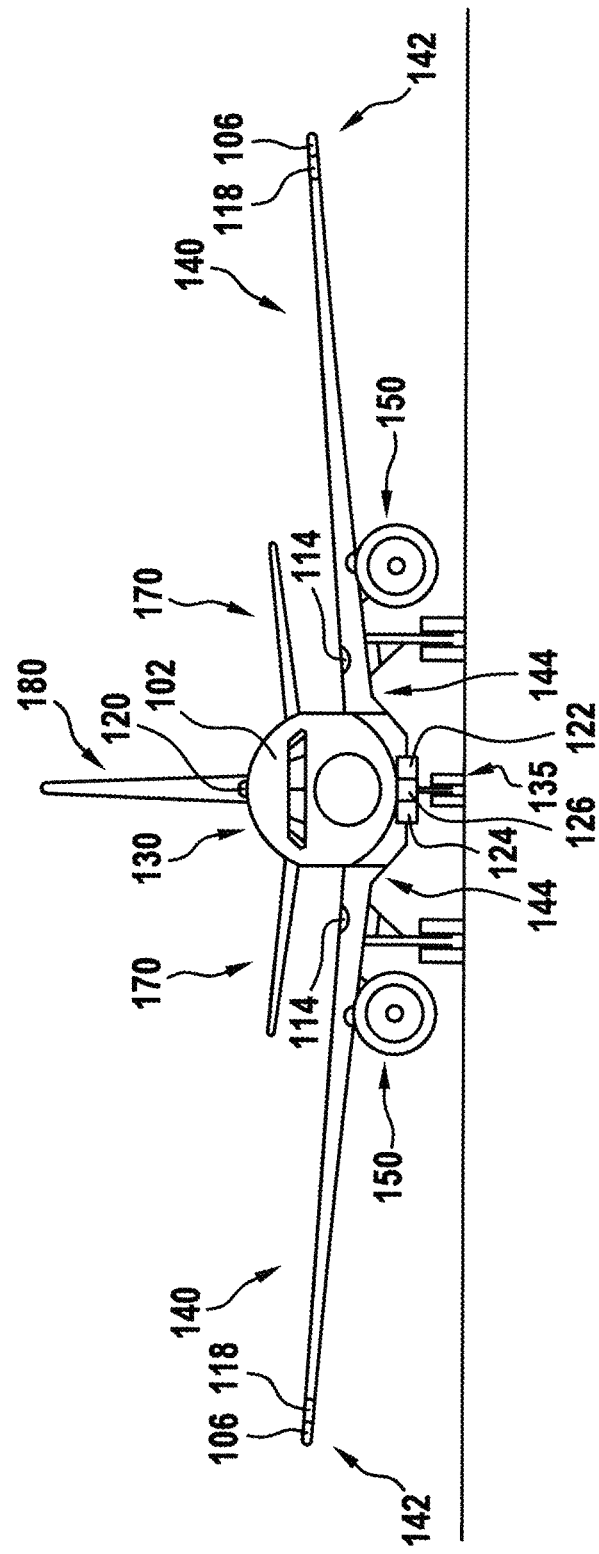
FIG. 1B shows a schematic front view of the aircraft shown in FIG. 1A.

FIGS. 1A and 1B, jointly referred to as FIG. 1 herein, show an aircraft 102, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 102 is shown in a top view in FIG. 1A and shown in a front view in FIG. 1B.

The aircraft 102 of FIG. 1 is equipped with a wide variety of exterior lights. In particular, the aircraft 102 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120, a landing light 122, a take-off light 124 and a taxi light 126. It is pointed out that these kinds of lights and their numbers are exemplary only and that the aircraft 102 may be equipped with additional lights that are not shown.

The three navigation lights 106 are positioned in the left and right wing tips 142 as well as at the tail 160 of the aircraft 102. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions.

The logo lights 108 are directed to the vertical stabilizer 180 of the aircraft 102 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 102. The wing scan lights 110 and the engine scan lights 112 are normally off during the flight and may be switched on periodically or upon reasonable cause by the pilots or by the aircrew, in order to check the wings 140 and the engines 150 of the aircraft 102.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 102. They are normally switched off during the flight of the aircraft 102.

The white anti-collision strobe lights 118 are positioned in the left and right wing tips 142 as well as at the tail 160 of the aircraft 102. The white anti-collision strobe lights 118 emit respective sequences of white light flashes during normal operation of the aircraft 102. It is also possible that the white anti-collision strobe lights 118 are only operated during night and in bad weather conditions.

The red-flashing anti-collision beacon lights 120 are positioned on the top and the bottom of the fuselage 130 of the aircraft 102. They are arranged at the height of the wings in the longitudinal direction of the aircraft 102. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1A. The red-flashing anti-collision beacon lights 120 are normally switched on during taxiing and during take-off and landing. Their output is perceived as a sequence of red light flashes in a given viewing direction.

In the embodiment depicted in FIGS. 1A and 1B, the runway turn-off lights 114 are located in the wings 140, in particular in the roots 144 of the wings 140, and the landing light 122, the take-off light 124 and the taxi light 126 are mounted to the front gear 135 of the aircraft 102. The front gear 135 is stored within the fuselage 130 of the aircraft 102 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 102.

The aircraft 102 may also comprise one or more multi-functional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 102, they are also depicted in phantom in FIG. 1A.

Each of these exterior aircraft lights may be an aircraft light according to an exemplary embodiment of the invention.

FIG. 2 shows a schematic longitudinal cross-sectional view of a section of the passenger cabin 204 of the aircraft 102 shown in FIG. 1.

Four seats 81, which are also referred to as passenger seats 81, are visible in FIG. 2. The passenger seats 81 are mounted to a floor 220 of the passenger cabin 204. Each of the depicted passenger seats 81 belongs to a different seat row 80a-80d. The seat rows 80a-80d are spaced apart from each other along the longitudinal direction L of the passenger cabin 204.

For each of the seat rows 80a-80d, a window 208 is provided, which allows the passengers to view the outside of the aircraft 102. Further, a plurality of overhead baggage compartments 222, which provide storage space for the passengers' baggage, are provided above the passenger seats 81.

Each seat row 80a-80d may include a plurality of passenger seats 81, for example three passenger seats 81, which are arranged next to each other along a lateral direction, which is orthogonal to the longitudinal direction L. The additional passenger seats, i.e. the middle seat and the window seat, of each seat row 80a-80d are not visible in FIG. 2, as they are arranged behind and therefore hidden by the depicted aisle seats 81.

An aircraft overhead passenger service unit (PSU) 209 is provided above each of the seat rows 80a-80d, respectively.

Each of the aircraft overhead passenger service units 209 may comprise at least one interior aircraft light. Each of the aircraft overhead passenger service units 209 may, for example, comprise a plurality of passenger reading lights 224, wherein the light output of each of the passenger reading lights 224 is directed towards one of the passenger seats 81 arranged below the respective aircraft overhead passenger service unit 209. Each of the aircraft overhead passenger service units 209 may further comprise one or more signal lights 226, which may, for example, light up in case a request for the cabin service personnel has been triggered by a passenger.

The passenger cabin 204 may further comprise at least one general cabin illumination light 228 for illuminating the passenger cabin 204. Washroom illumination lights may be installed within washrooms provided within the passenger cabin 204.

Each of these interior aircraft lights may be an aircraft light according to an exemplary embodiment of the invention.

Figure 3:
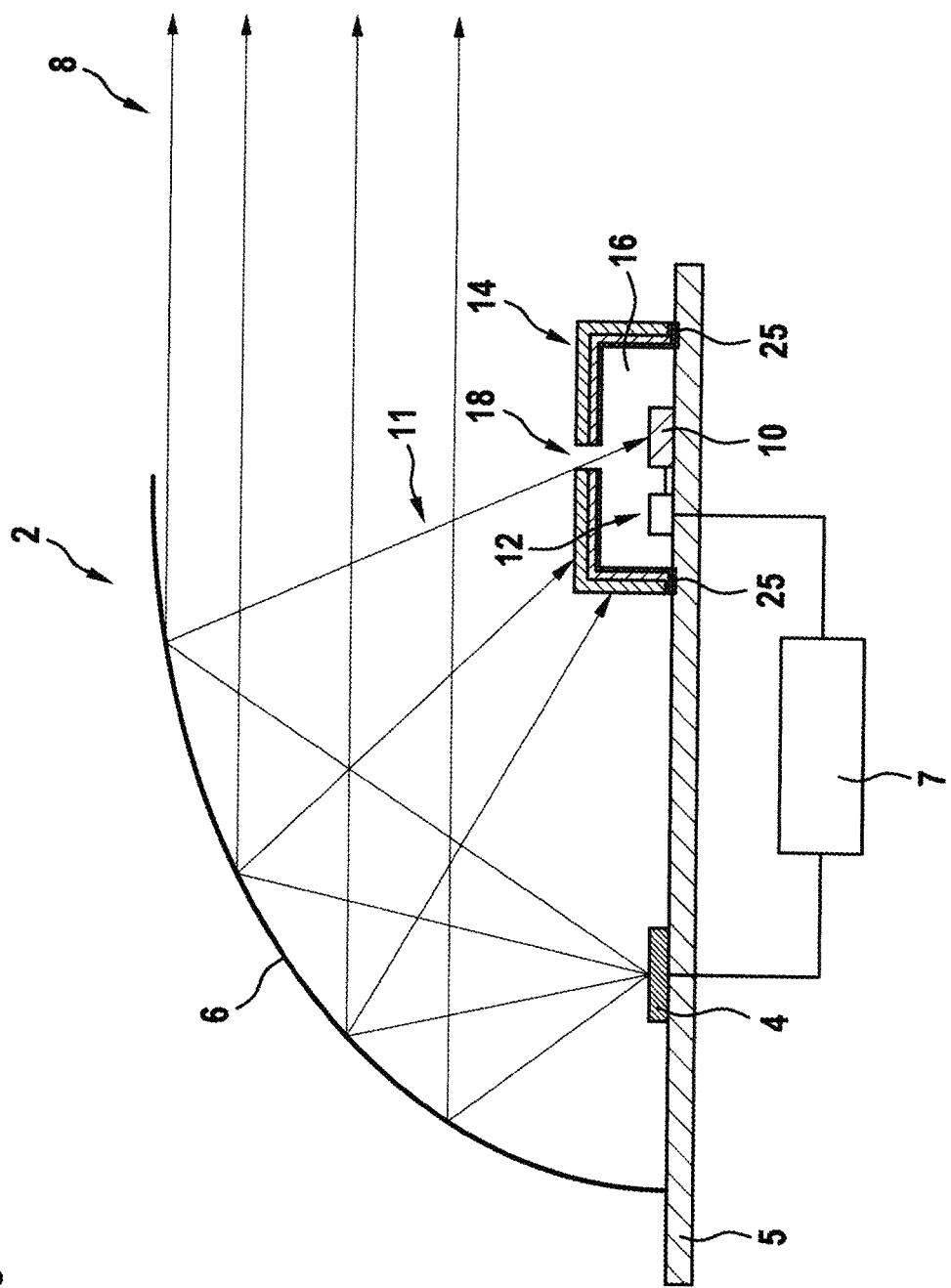
FIG. 3 depicts a schematic cross-sectional view of an aircraft light according to an exemplary embodiment of the invention.

FIG. 3 depicts a schematic cross-sectional view of an aircraft light 2 according to an exemplary embodiment of the invention.

The aircraft light 2 comprises a light source 4, for example an LED, for emitting a light output and an optical element 6 for shaping/transforming the light output, as emitted by the light source 4, into an aircraft light output 8.

The light source 4 is supported by a support board 5. The support board 5 may in particular be a printed circuit board that comprises electrical paths (not shown) for supplying electric power to the light source 4. Although only one light source 4 is depicted in FIG. 3, an aircraft light 2 according to an exemplary embodiment may comprise a plurality of light sources. The plurality of light sources may be controllable collectively or separately from each other. When being controlled separately, the aircraft light 2 may selectively emit different aircraft light outputs.

In the exemplary embodiment depicted in FIG. 3, the optical element 6 is a reflector, in particular a parabolic reflector. In addition or as an alternative to a reflector, the aircraft light 2 may comprise other optical elements, in particular light transmissive optical elements or light blocking elements. The optical element(s) of the aircraft light 2 may, for example, include at least one lens, at least one prism, and/or at least one shutter.

The aircraft light 2 further comprises a light sensor 10 and an electronic evaluation component 12 for evaluating a performance level of the aircraft light output 8 based on the light detected by the light sensor 10.

In the exemplary embodiment depicted in FIG. 3, the light sensor 10, the electronic evaluation component 12 and the optical element 6 are mounted to the same support board 5 as the light source 4. In alternative embodiments, which are not explicitly shown in the figures, the light sensor 10, the electronic evaluation component 12 and the optical element 6 may be mounted to a different support/to different supports, which may be provided separately from the support board 5 that supports the light source 4.

A sensor cap 14 is arranged over the light sensor 10 and the electronic evaluation component 12. The sensor cap 14 defines a cavity 16 accommodating the light sensor 10 and the electronic evaluation component 12. Alternately, the electronic evaluation component 12 may be arranged outside the cavity 16. The aircraft light 2 may also comprise a plurality of electronic evaluation components, wherein one or more of these electronic evaluation components may be arranged within the cavity 16 and one or more of these electronic evaluation components may be arranged outside the cavity 16.

The aircraft light 2 further comprises a controller 7 for driving the light source 4. The controller 7 may be coupled to the electronic evaluation component 12, and the controller 7 may be configured for driving the light source 4 depending on the performance level of the aircraft light output 8, which is determined by the electronic evaluation component 12 based on the amount of light detected by the light sensor 10. The controller 7 may in particular be configured for controlling the operation of the light source 4 in accordance with a closed control loop.

In order to allow a light evaluation portion 11 of the light, emitted by the light source 4, to pass through the sensor cap 14 for being detected by the light sensor 10, an opening 18 is formed within the sensor cap 14.

Although only a single opening 18 is shown in the cross-sectional view depicted FIG. 3, two or more openings 18, in particular two, three, four, five, six, seven, eight openings, may be formed within the sensor cap 14, in order to increase the amount of light entering into the cavity 16. Providing a plurality of openings 18 in the sensor cap 14 may further result in a more even distribution of the light within the cavity 16. This may allow for a more reliable evaluation of the light evaluation portion 11 entering the cavity 16.

In the embodiment depicted in FIG. 3, the opening 18 is formed for allowing light that has been reflected by the optical element 6 to pass into the cavity 16. In further embodiments, which are not explicitly shown in the figures, the light sensor 10 and the opening 18 may be positioned so that light that has been emitted by the light source 4 and that has not been reflected by the optical element 6 may pass through the opening 18 into the cavity 16.

While the opening 18 or a plurality of openings, if present, provide a light entry path for some light from the light source 4, the sensor cap is an effective light barrier for ambient light and/or light stemming from other light sources/other aircraft lights in the environment of the aircraft light 2. In this way, an evaluation of the light output performance of the aircraft light 2 that is mostly free of external influences may be achieved.

The opening 18 may have a lateral extension D (see FIG. 4), in particular a diameter, in the range of between 0.3 mm and 1 mm, in particular a lateral extension in the range of between 0.5 mm and 0.6 mm.

As stated above, the electronic evaluation component 12 is a means for evaluating the performance level of the aircraft light output 8. In particular, a degradation of the light output, such as due to aging and/or due to thermal degradation of the light source 4, may be detected. Also, a complete failure of the light source 4 may be detected.

In the exemplary embodiment of FIG. 3, the aircraft light 2 is a highly targeted aircraft light. The optical element 6, which is a parabolic reflector in the exemplary embodiment of FIG. 3, collects most of the light emitted by the light source 4 around a primary light output direction. Examples of such targeted aircraft lights are landing lights, take-off lights, engine scan lights, reading lights, etc. It is stressed that the set-up of the aircraft light 2 is exemplary only and that other arrangements of light source(s) and optical element(s) and other types of light output distributions are possible as well. Also, it is possible that an aircraft light according to exemplary embodiments of the invention has multiple light modules. For example, an aircraft light may have multiple light modules that each have an optical set-up substantially as shown in FIG. 3. In this way, a targeted light output with a particularly high light intensity may be achieved. Aircraft lights with multiple different light modules are possible as well.

The sensor cap 14 has a layered structure comprising at least three layers.

Figure 4:
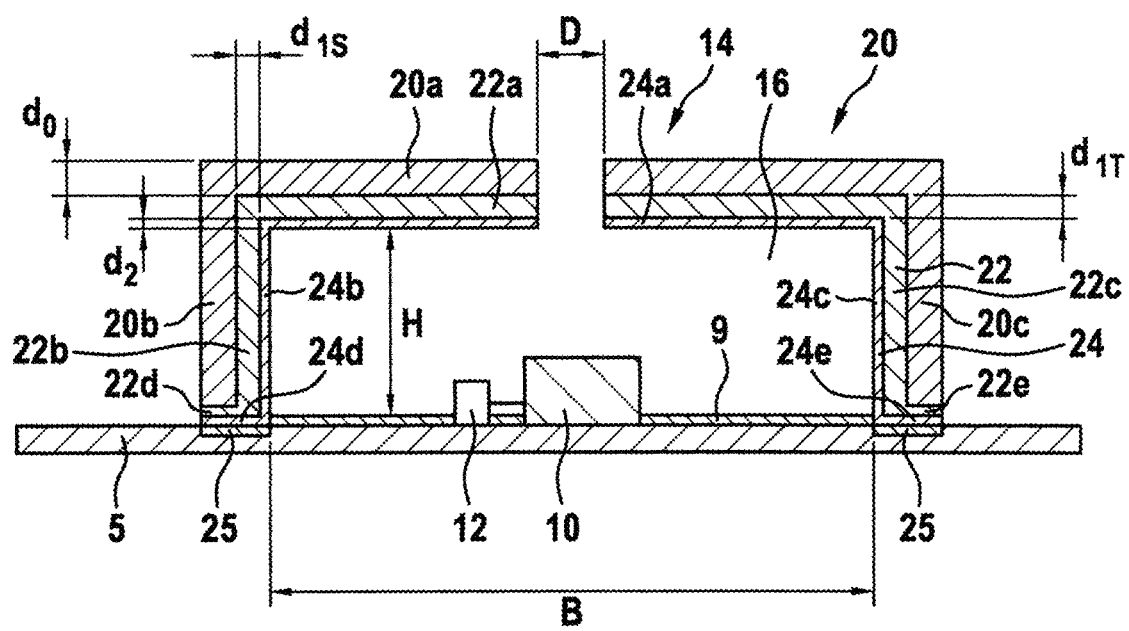
FIG. 4 depicts an enlarged cross-sectional view of a sensor cap which may be employed in an aircraft light according to an exemplary embodiment of the invention.

FIG. 4 depicts an enlarged cross-sectional view of the sensor cap 14 showing its layered structure in more detail.

The sensor cap 14 comprises a cap-shaped support layer 20, forming an outer layer of the sensor cap 14.

In the cross-sectional view depicted in FIG. 4, the cap-shaped support layer 20 has the shape of an inverse U, with the open side of the U facing the support board 5.

The cap-shaped support layer 20 in particular includes a lid portion 20a, extending parallel to the support board 5, and two side portions 20b, 20c, extending orthogonal from the lid portion 20a to the support board 5. The two side portions 20b, 20c may be two opposing sidewalls of the sensor cap 14, for example of a sensor cap 14 having a rectangular outline. In case the sensor cap 14 has a round outline, such as a circular outline or an elliptical outline, the two side portions 20b, 20c, shown in FIG. 4, may be opposing portions of a single annular sidewall of the sensor cap 14.

The cap-shaped support layer 20 may have a thickness do in the range of between 0.3 mm and 0.5 mm, in particular a thickness do of about 0.4 mm.

The lid portion 20a and the side portions 20b, 20c of the cap-shaped support layer 20 may have the same thickness. In an alternative configuration, the lid portion 20a and the side portions 20b, 20c may have different thicknesses.

The cap-shaped support layer 20 may be made of a resin material or of a plastics material or of a composite material, such as a fiberglass-reinforced composite material. The cap-shaped support layer 20 may in particular be made of FR-4.

The sensor cap 14 further comprises a first coating layer 22, arranged on an inner side of the cap-shaped support layer 20, i.e. on the side of the support layer 20 facing the cavity 16. The first coating layer 22 may be made of a first metal. The first metal may be a transition metal, in particular copper.

The first coating layer 22 includes a central portion 22a, applied to the lid portion 20a of the cap-shaped support layer 20, and two side portions 22b, 22c, which are applied to the side portions 20a, 20b of the cap-shaped support layer 20.

The first coating layer 22 may further include foot portions 22d, 22e, extending parallel to the support board 5 between end faces of the side portions 20b, 20c of the cap-shaped support layer 20 and the support board 5.

A second coating layer 24 made of a second metal, which differs from the first metal, is arranged on the side of the first coating layer 22 facing the cavity 16. As a result, the first coating layer 22 is sandwiched between the cap-shaped support layer 20 and the second coating layer 24. The second metal may be a noble metal, in particular silver or gold. It is also possible that tin is used as the second metal.

The second coating layer 24 includes a central portion 24a, applied to the central portion 22a of the first coating layer 22, and two side portions 24b, 24c, which are applied to the side portions 22a, 22b of the first coating layer 22.

The second coating layer 24 may further include foot portions 24d, 24e, extending parallel to the support board 5 between end faces of the side portions 20b, 20c of the cap-shaped support layer 20 and the support board 5. The foot portions 24d, 24e of the second coating layer may in particular be sandwiched between the foot portions 22d, 22e of the first coating layer 22 and the support board 5, as it is depicted in FIG. 4.

For fixing the sensor cap 14 to the support board 5, the foot portions 22d, 22e of the first coating layer 22 and/or the foot portions 24d, 24e of the second coating layer 24 may be soldered to corresponding metallic mounting areas 25, provided on the support board 5.

The side portions 22b, 22c and the foot portions 22d, 22e of the first coating layer 22 may have a thickness $d_{1S}$ in the range of between 10 μm and 50 μm, in particular a thickness $d_{1S}$ in the range of between 20 μm and 30 μm, more particularly a thickness $d_{1S}$ of about 25 μm, respectively.

The central portion 22a of the first coating layer 22 may have a thickness $d_{1T}$ in the range of between 10 μm and 100 μm, in particular a thickness $d_{1T}$ in the range of between 20 μm and 60 μm, more particularly a thickness $d_{1T}$ of about 25 μm.

The second coating layer may have a thickness $d_2$ in the range of between 0.025 μm and 0.2 μm, in particular a thickness $d_2$ of in the range of between 0.05 μm and 0.10 μm.

The cavity 16 may have a height H in the range of between 1.0 mm and 2.5 mm, in particular a height H in the range of between 1.5 mm and 2.0 mm.

The cavity 16 may have a lateral extension B in any of its lateral dimensions in the range of between 3 mm and 10 mm, in particular a lateral extension B in the range of between 5 mm and 8 mm.

Although not explicitly shown in the figures, the sensor cap 14 may comprise at least one additional coating layer, which may be applied to the outside of the cap-shaped support layer 20. This additional coating layer maybe made of metal, in particular of a transition metal, such as copper.

The combination of the two coating layers 22, 24 made of metal, which are applied to the cap-shaped support layer 20 of the sensor cap 14, provides an effective electromagnetic interference shield (EMI shield) for ensuring a low level of electromagnetic interference or even preventing electromagnetic interference at the light sensor. In particular, the sensor cap 14 may provide an effective protection against electromagnetic interference between the electronic evaluation component 12 and/or the light sensor 10, arranged within the cavity 16, and other electronic components, which may be arranged outside the cavity 16, as well as external electromagnetic influences.

The other electronic components, arranged outside the cavity 16, may include other components of the aircraft light 2, in particular components of the controller 7. The other electronic components, arranged outside the cavity 16, may further include other electronic components of an aircraft, to which the aircraft light 2 is mounted, which are not part of the aircraft light 2. For example, the sensor cap 14 may provide an effective electromagnetic interference shield (EMI shield) with respect to the power supply system of the aircraft and with respect to the wireless communication devices of the aircraft.

Combining at least two coating layers 22, 24 in an aircraft light according to exemplary embodiments of the invention may allow for enhancing the shielding capabilities of the EMI shield at reasonable costs by combining a thicker first layer made of a less expensive metal, such as copper, with a thinner second layer made of a more expensive metal, in particular a noble metal, such as gold.

The metal used for forming the second coating layer 24, which is exposed to the environment as it is not covered by another layer, may in particular be a noble metal, which is less prone to erosion/oxidation than the less expansive metal, which is used for forming the first coating layer 22.

The metal used for forming the second coating layer 24 faces the light sensor 10 and may be selected to have light reflection characteristics that are beneficial for the operation of the light sensor 10. The metal used for forming the second coating layer 24 may in particular be selected to strongly reflect the light emitted by the light source 4. In this way, a high percentage of the light that enters the cavity 16 will eventually reach the light sensor 10.

The reflection of light within the cavity 16 may be enhanced further by providing at least a portion of a surface of the support board 5, facing the cavity 16, as a light reflective surface, in particular as a diffusely reflective surface, for example as a white surface.

At least a portion of the surface of the support board 5 within the cavity 16 may be coated with a light reflective coating 9, in particular with a diffusely reflective coating, such as a white coating, for providing the desired reflective properties of the surface portion.

Providing the second coating layer 24 as a highly reflective second coating layer 24 may also be particularly beneficial in a further embodiment of an aircraft light 2, as discussed below.

Figure 5:
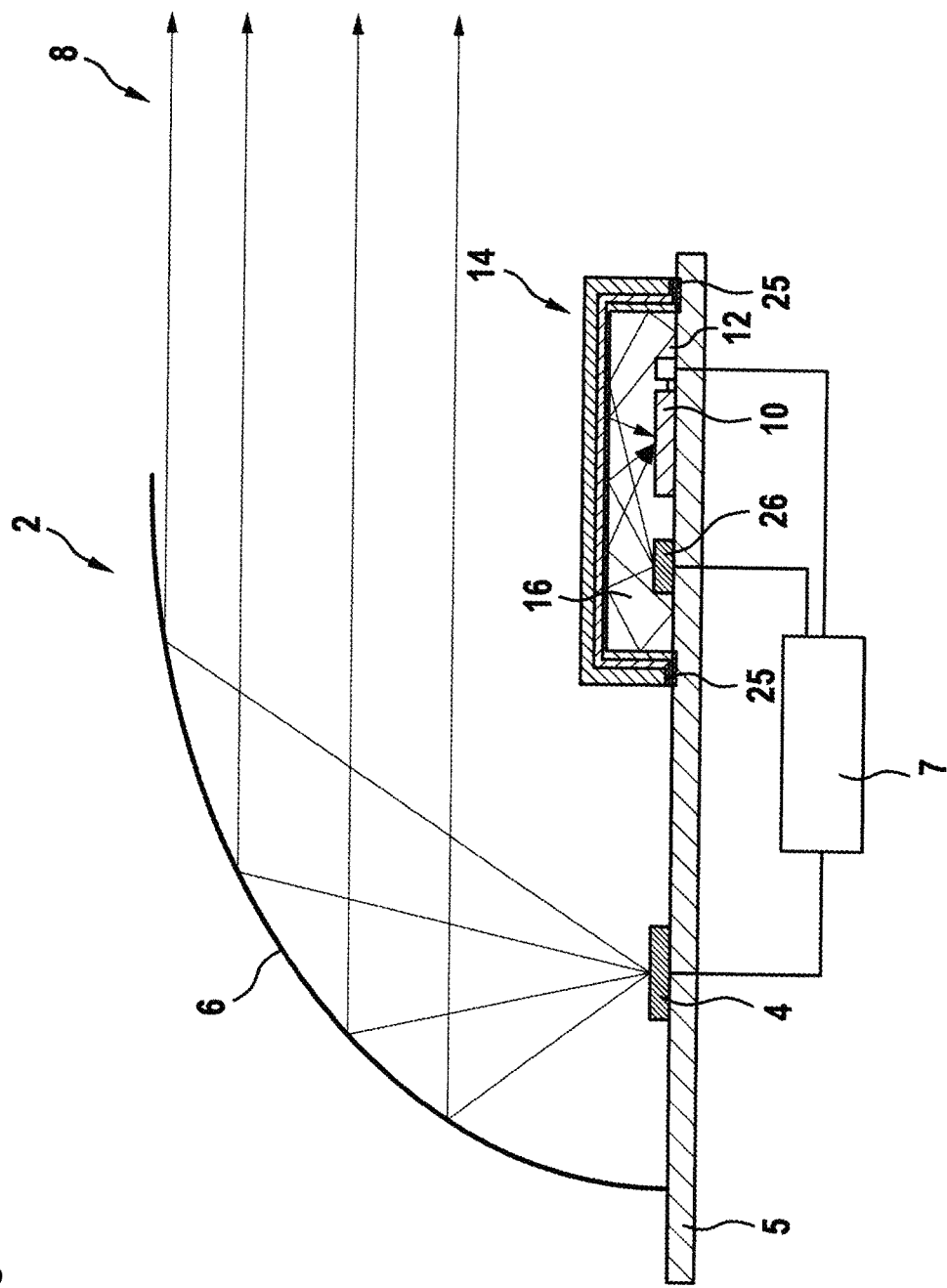
FIG. 5 depicts a schematic cross-sectional view of an aircraft light according to another exemplary embodiment of the invention.

A schematic cross-sectional view of an aircraft light 2 in accordance with a further embodiment of the invention is depicted in FIG. 5.

In the further embodiment depicted in FIG. 5, the components/features of the aircraft light 2 that correspond to the components/features depicted in FIGS. 3 and 4 are denoted with the same reference numerals, and they are not described in detail again. Instead, reference is made to the detailed description of FIGS. 3 and 4 above.

In the further embodiment depicted in FIG. 5, the sensor cap 14 has the same layered structure as the sensor cap 14 depicted in FIGS. 3 and 4. The sensor cap 14 of the embodiment depicted in FIG. 5 differs from the embodiment depicted in FIG. 3 in that no opening is formed in the sensor cap 14. Instead, the sensor cap 14 is fully opaque, so that no light can enter into the cavity 16 defined by the sensor cap 14.

In order to allow for evaluating a performance level of the aircraft light output 8 based on light detected by the light sensor 10 arranged within the cavity 16, the aircraft light 2 comprises a reference light source 26, which is arranged within the cavity 16.

Light emitted by the reference light source 26 is reflected by the second coating layer 24 and a potential light reflective coating 9, applied to the support board 5. A portion of the reflected light is detected by the light sensor 10.

The reference light source 26 may be selected to be of the same type as the light source 4. Alternatively, the light source 26 may be selected to be a different type of light source, but to have aging/thermal degradation characteristics that are similar to or identical with the aging/thermal degradation characteristics of the light source 4 of the aircraft light 2, which provides the aircraft light output 8. Further, the reference light source 26 may be arranged in close proximity to the light source 4 and may be switched on/off together with the light source 4. In this way, the reference light source 26 may experience similar aging/thermal degradation as the light source 4. In consequence, the electronic evaluation component 12 may determine the aging/thermal degradation of the light source 4, providing the aircraft light output 8, based on the light emitted by the reference light source 26 and detected by the light sensor 10. The reference light source 26 may act as a proxy for the evaluation of the light source 4.

Figure 6:
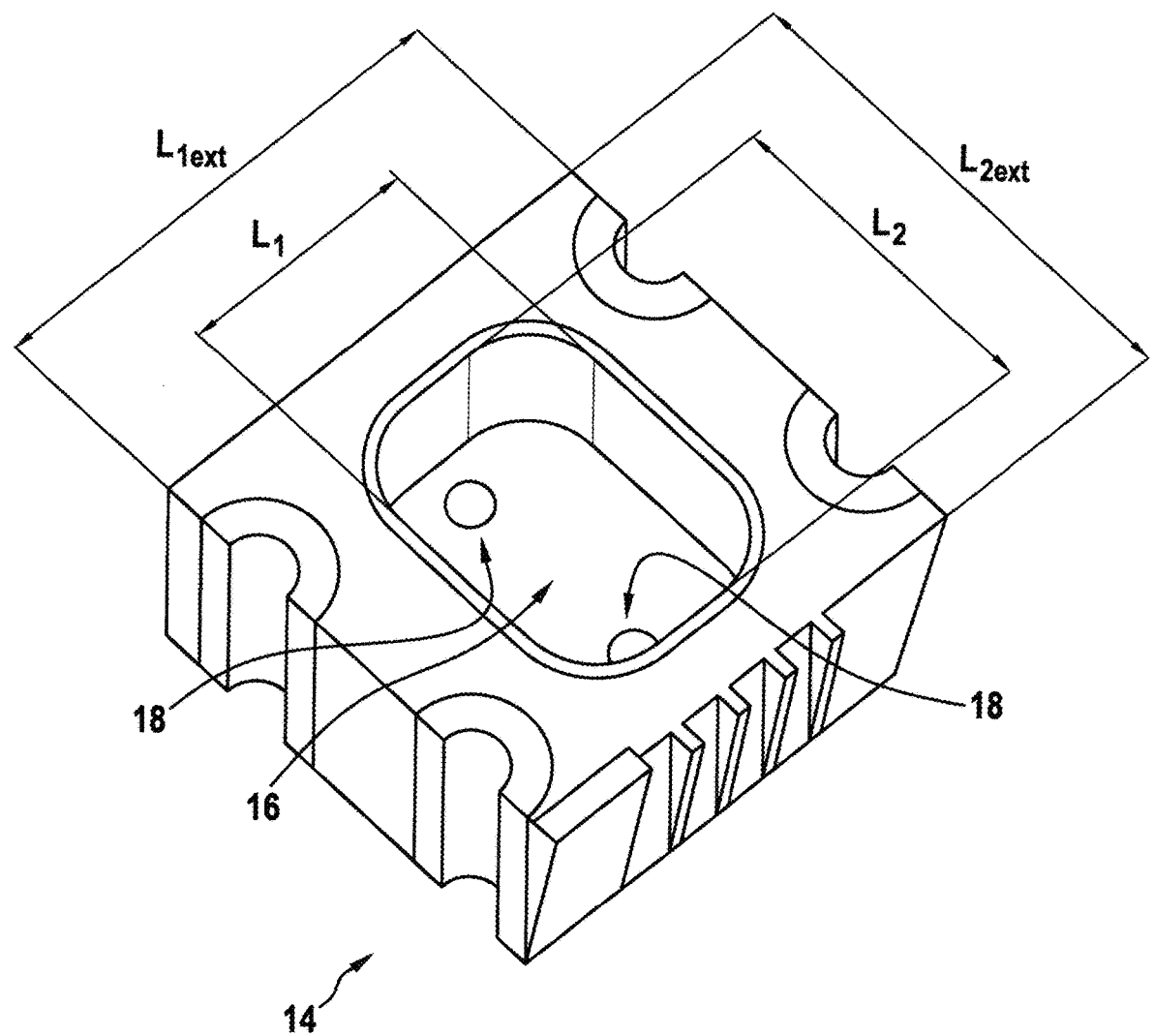
FIG. 6 shows a perspective view of a sensor cap, which may be employed in an aircraft light according to an exemplary embodiment of the invention, from below.

FIG. 6 shows a perspective view of a sensor cap 14, which may be employed in an aircraft light according to an exemplary embodiment of the invention, from below, i.e. from the side facing the support board 5, when the sensor cap 14 is mounted to the support board 5, as it is depicted in FIG. 3.

In the exemplary embodiment depicted in FIG. 6, the cavity 16 is formed as a basically rectangular cavity 16 with rounded edges. Two openings 18 are formed in the lid portion of the cavity 16.

The cavity 16 may have lateral extensions $L_1$, $L_2$ in the range of between 3 mm and 10 mm, in particular lateral extensions $L_1$, $L_2$ in the range of between 5 mm and 8 mm.

The sensor cap 14 may have external extensions $L_{ext1}$, $L_{ext2}$ in the range of between 5 mm and 15 mm, in particular lateral extensions $L_{ext1}$, $L_{ext2}$ in the range of between 7 mm and 10 mm.

In the following, a method of manufacturing a sensor cap 14 for an aircraft light in accordance with an exemplary embodiment of the invention is described with reference to FIGS. 7A to 7E.

The sensor cap 14 may be manufactured from a block of support material 30, in particular from a block of FR-4 material. A schematic cross-sectional view of such a block of support material 30 is depicted in FIG. 7A.

The block of support material 30 may be a rest of support material, which is left over from the production of support boards 5. Using such rests of support material for forming the sensor caps 14 allows for manufacturing the sensor caps 14 at very low raw material cost.

For forming the sensor cap 14, at least one cavity 16 is formed within the block of support material 30. The at least one cavity 16 may in particular be machined, more in particular milled, into the block of support material 30.

For increasing the efficiency of the manufacturing process, a plurality of cavities 16 may be formed next to each other in the block of the support material 30, as it is schematically depicted in FIG. 7B.

The cavities 16 may be arranged in a row of cavities 16, as it is depicted in FIG. 7B. The cavities 16 may also be arranged in a two-dimensional configuration, for example in a matrix, which is not visible in the cross-sectional view depicted in FIG. 7B.

Figure 7C:
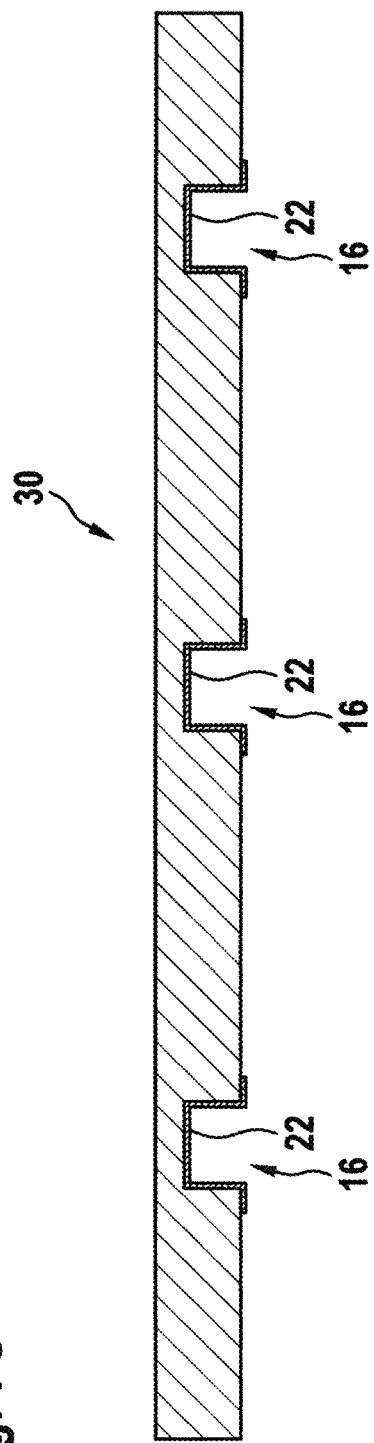

In a next step, the inner walls of each of the cavities 16 are coated with the first metal for forming a first coating layer 22, for example a layer of a transition metal, such as copper (see FIG. 7C).

Figure 7D:
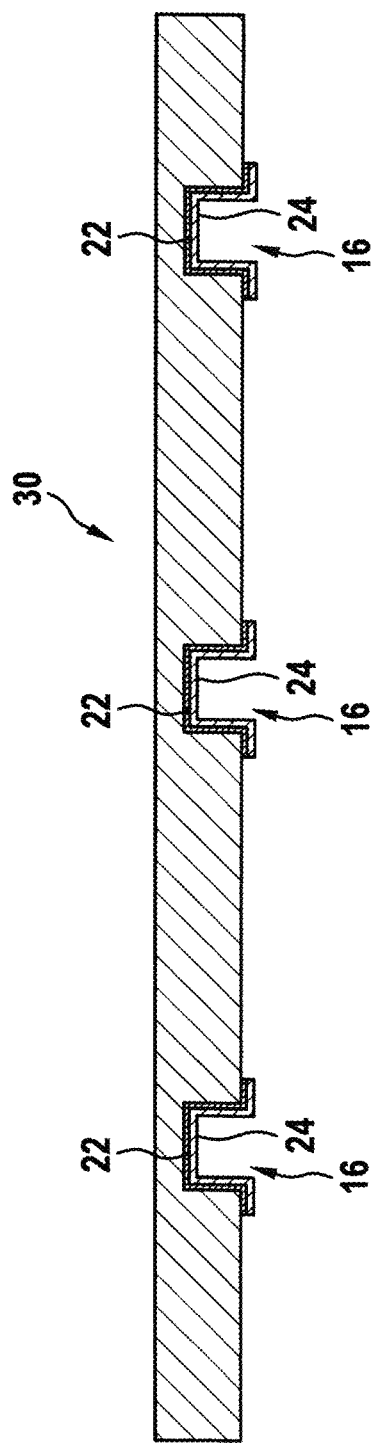

After the first coating layer 22 has been formed, the first coating layer 22 is coated with the second metal, for example with a layer of a noble metal, such as gold, for forming a second coating layer 24 on the first coating layer 22 (see FIG. 7D).

Desmearing and/or direct metallization processes may be employed for forming the first coating layer 22 and/or the second coating layer 24.

Optionally, the opposing side of the block of support material 30, i.e. the top side of the block of support material 30 depicted in FIGS. 7A to 7D, which will form the outside of the sensor cap 14, may be coated with a metal, such as copper, as well.

After the first and second coating layers 22, 24 have been formed, portions 32 of the block of support material 30, comprising the cavities 16, are cut out of the block of support material 30 for forming the individual sensor caps 14, as it is schematically depicted in FIG. 7E.

An aircraft light 2 according to an exemplary embodiment of the invention may then be assembled by mounting a light sensor 10 to the support board 5 and arranging a sensor cap 14 over the light sensor 10, as it is depicted in FIGS. 3 and 5.

The sensor cap 14 may be mounted and fixed to the support board 5 by soldering at least one of the first coating layer 22 and the second coating layer 24 of the sensor cap 14 to at least one metallic mounting area 25, which is provided on the support board 5. This allows for mounting and fixing the sensor cap 14 reliably and cost efficiently to the support board 5.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft light, comprising:
   at least one light source for providing an aircraft light output;
   a light sensor for detecting a performance level of the aircraft light output; and
   a sensor cap, arranged over the light sensor and defining a cavity for accommodating the light sensor, the sensor cap configured to allow a light evaluation portion of a light, emitted by the at least one light source outside the cavity, to pass into the cavity;
   the sensor cap having a layered structure comprising:
   a cap-shaped support layer;
   a first coating layer, wherein the first coating layer is made of a first metal and is arranged on an entirety of an inner side of the cap-shaped support layer; and
   a second coating layer, wherein the second coating layer is made of a second metal and is arranged on an entirety of the first coating layer facing the cavity.

2. The aircraft light according to claim 1,
   wherein the cap-shaped support layer is made of a resin material or of a plastics material or of a composite material.

3. The aircraft light according to claim 1, wherein the sensor cap comprises at least one opening, allowing the light evaluation portion of the light, emitted by the at least one light source outside the cavity, to pass into the cavity.

4. The aircraft light according to claim 1, further comprising a reference light source, wherein the reference light source is arranged within the cavity defined by the sensor cap.

5. The aircraft light according to claim 1, wherein the sensor cap is mounted to a support board, wherein the support board is a printed circuit board.

6. The aircraft light according to claim 5, wherein at least a portion of a surface of the support board, which faces the cavity, is a light reflective surface.

7. The aircraft light according to claim 5,
   wherein the cap-shaped support layer has a peripheral wall with an end face, facing the support board, and wherein at least one of the first coating layer and the second coating layer extends onto the end face; and
   wherein the sensor cap is soldered to the support board.

8. The aircraft light according to claim 1,
   wherein the cap-shaped support layer has a thickness ($d_0$) in the range of between 0.3 mm and 0.5 mm;
   wherein the first coating layer has a thickness ($d_{1S}$, $d_{1T}$) in the range of between 10 μm and 50 μm; and
   wherein the second coating layer has a thickness ($d_2$) in the range of between 0.025 μm and 0.2 μm.

9. The aircraft light according to claim 1,
   wherein the cavity has a height (H) in the range of between 1.0 mm and 2.5 mm; and
   wherein the cavity has a lateral extension (B) in the range of between 3 mm and 10 mm.

10. The aircraft light according to claim 1, further comprising an electronic evaluation component for determining the performance level of the aircraft light output from a light detection signal provided by the light sensor;
    wherein the aircraft light in particular further comprises a controller, coupled to the electronic evaluation component, wherein the controller is configured to drive the at least one light source depending on the performance level of the aircraft light output.

11. The aircraft light according to claim 1,
wherein the aircraft light is an interior aircraft light, wherein the interior aircraft light is a general cabin illumination light, a signal light, or a passenger reading light, or
wherein the aircraft light is an exterior aircraft light, wherein the exterior aircraft light is an aircraft navigation light or a white strobe anti-collision light or a red-flashing aircraft beacon light or a logo light or a wing scan light or an engine scan light or a cargo loading light or an aircraft headlight, for example an aircraft landing light or an aircraft take-off light or an aircraft taxi light or an aircraft runway turn-off light, or a multi-functional exterior aircraft light, having the functionalities of at least two of an aircraft navigation light, a white strobe anti-collision light, a red-flashing aircraft beacon light, a logo light, a wing scan light, an engine scan light, a cargo loading light, an aircraft landing light, an aircraft take-off light, an aircraft taxi light, and an aircraft runway turn-off light.

12. An aircraft, such as wherein the aircraft is an airplane or a helicopter, comprising the least one aircraft light according to claim 1.

13. A method of manufacturing the sensor cap for covering the light sensor in the aircraft light of claim 1, wherein the method comprises the steps of:
machining a cavity into a block of support material;
coating the inner walls of the cavity with a first coating layer made of a first metal;
coating the first metal with a second coating layer made of a second metal; and
cutting out a portion from the block of support material, with the cut-out portion comprising the cavity.

14. The method according to claim 13, wherein the method takes place as part of a joint manufacturing of a plurality of sensor caps, wherein the joint manufacturing of a plurality of sensor caps comprises the steps of:
machining a plurality of cavities into a plurality of portions of the block of support material;
coating the inner walls of each of the plurality of cavities with the first metal;
coating the first metal in each of the plurality of cavities with the second metal; and
cutting out the plurality of portions from the block of support material.

15. A method of assembling an aircraft light, wherein the method includes:
manufacturing the sensor cap in accordance with claim 13;
mounting a light sensor to a support board; and
arranging the sensor cap over the light sensor and mounting the sensor cap to the support board, with the light sensor being arranged within the cavity of the sensor cap;
wherein the mounting of the sensor cap to the support board comprises soldering at least one of the first metal and the second metal of the sensor cap to the support board.

16. The aircraft light according to claim 1,
wherein the cap-shaped support layer is made of a composite material and wherein the composite material is a fiberglass-reinforced composite material.

17. The aircraft light according to claim 16, wherein the composite material is FR-4.

18. The aircraft light according to claim 1, wherein the first coating layer is made of copper and wherein the second coating layer is made of gold.

19. The aircraft light according to claim 6, wherein the light reflective surface is a diffusely reflective surface.

20. The method according to claim 13, wherein the support material is FR-4 material and wherein the first metal is copper, and wherein the second metal is gold.

* * * * *